US007327710B2

(12) United States Patent
Nishimura (10) Patent No.: US 7,327,710 B2
(45) Date of Patent: Feb. 5, 2008

(54) TRANSPORT FORMAT ADJUSTING UNIT OF CDMA RECEIVER

(75) Inventor: Tomoyuki Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 519 days.

(21) Appl. No.: 10/845,216

(22) Filed: May 14, 2004

(65) Prior Publication Data

US 2004/0233884 A1 Nov. 25, 2004

(30) Foreign Application Priority Data

May 20, 2003 (JP) ............................ 2003-141434

(51) Int. Cl.
*H04B 7/216* (2006.01)
(52) U.S. Cl. ..................... 370/335; 370/320; 370/342; 370/441
(58) Field of Classification Search ............... 370/342, 370/320, 278, 277, 335, 252, 282, 437, 441, 370/329, 465, 479
See application file for complete search history.

(56) References Cited

U.S. PATENT DOCUMENTS

| 6,882,636 | B1 * | 4/2005 | Kim et al. .................. 370/342 |
| 2003/0026350 | A1 * | 2/2003 | Lim et al. ................... 375/295 |
| 2003/0035467 | A1 | 2/2003 | Shimizu | |
| 2005/0018614 | A1 * | 1/2005 | Kiran ......................... 370/252 |

FOREIGN PATENT DOCUMENTS

| EP | 1 286 489 | 2/2003 |
| JP | 2001203652 | * 7/2001 |
| JP | 2002-246949 | 8/2002 |
| JP | 2003-37583 | 2/2003 |

OTHER PUBLICATIONS p. 103-119 and 143-146 of "W-CDMA Mobile Communication System" under the editorship of Keiji Tachikawa, published by Maruzen Co., Ltd. on Jun. 25, 2001.
"Universal Mobile Telecommunications System (UMTS); Services provided by the physical layer (3GPP TS 25.302 version 5.4.0 Release 5)", ETSI Standards, European Telecommunications Standards Institute, vol. 3-R2, No. V540, Mar. 2003, XP014008601, pp. 1-65.

* cited by examiner

*Primary Examiner*—George Eng
*Assistant Examiner*—Huy Phan
(74) *Attorney, Agent, or Firm*—Young & Thompson (57) ABSTRACT

As the transport format used for the respective processing at least including rate matching, error correction decoding, and CRC judgment, a within-TTI majority TF adjusting unit decides the majority transport format as the most reliable one, of the received transport formats when receiving various transport formats depending on frames during a transmission time interval of a transport channel. As another reliable transport format, when determining the transport format information for use in the decoding processing of a transport channel, the transport format to be selected from the transport formats in the frames obtained during the same transmission time interval may be decided according to the maximum likelihood or the maximum receiving quality other than the majority rule.

6 Claims, 10 Drawing Sheets

TFCI TABLE

| TFCI | TF | | |
|---|---|---|---|
| | TRANSPORT CH-0 | TRANSPORT CH-1 | TRANSPORT CH-2 |
| 0 | 0 | 0 | 0 |
| 1 | 0 | 1 | 0 |
| 2 | 0 | 2 | 0 |
| 3 | 1 | 0 | 0 |
| 4 | 1 | 1 | 0 |
| 5 | 1 | 2 | 0 |
| 6 | 2 | 0 | 0 |
| 10 | 3 | 1 | 0 |
| 11 | 3 | 2 | 0 |
| 12 | 4 | 0 | 0 |
| 16 | 5 | 1 | 0 |
| 17 | 5 | 2 | 0 |
| 18 | 0 | 0 | 1 |
| 22 | 1 | 1 | 1 |
| 23 | 1 | 2 | 1 |
| 24 | 2 | 0 | 1 |
| 27 | 3 | 0 | 1 |
| 28 | 3 | 1 | 1 |
| 29 | 3 | 2 | 1 |
| 33 | 5 | 0 | 1 |
| 34 | 5 | 1 | 1 |
| 35 | 5 | 2 | 1 |

FIG. 3

| TRANSPORT CH NO. | ELAPSE TIME(ms) | 0 | 10 | 20 | 30 | TTI |
|---|---|---|---|---|---|---|
| | SEND TFCI | 35 | 23 | 23 | 29 | |
| | RECEIVE TFCI | 35 | 22 | 23 | 11 | |
| 0 | TF JUDGMENT | 5 | 1 | 1 | 3 | |
| | ADJUSTMENT TF | 5 | 1 | 1 | 3 | 10ms |
| 1 | TF JUDGMENT | 2 | 1 | 2 | 2 | |
| | ADJUSTMENT TF | 2 | | 2 | | 20ms |
| 2 | TF JUDGMENT | 1 | 1 | 1 | 0 | |
| | ADJUSTMENT TF | 1 | | | | 40ms |

(MAJORITY RULE ADJUSTMENT)

FIG. 4

| TRANSPORT CH NO. | | TRANSPORT FORMAT (TF) INFORMATION | 0 | 1 | 2 | 3 | 4 | 5 |
|---|---|---|---|---|---|---|---|---|
| | 0 | TRANSPORT BLK NUMBER | 0 | 1 | 2 | 4 | 8 | 12 |
| | | TRANSPORT BLK SIZE | 336 | 336 | 336 | 336 | 336 | 336 |
| | 1 | TRANSPORT BLK NUMBER | 0 | 1 | 2 | | | |
| | | TRANSPORT BLK SIZE | 0 | 39 | 81 | | | |
| | 2 | TRANSPORT BLK NUMBER | 0 | 1 | | | | |
| | | TRANSPORT BLK SIZE | 148 | 148 | | | | |

| TRANSPORT CH NO. | ELAPSE TIME (ms) | 0 | 10 | 20 | 30 | TTI |
|---|---|---|---|---|---|---|
| 2 | SEND TFCI | 35 | 23 | 23 | 29 | 40ms |
| | RECEIVE TFCI | 35 | 1 | 22 | 11 | |
| | TF JUDGMENT | 1 | 0 | 1 | 0 | |
| | TFCI LIKELIHOOD | 0x0831 | 0x0374 | 0x0265 | 0x0349 | |
| | TOTAL OF TF COUNTING LIKELIHOOD — TF CANDIDATE 0 | No data | 0x0374 | 0x0374 | 0x06BD | |
| | TOTAL OF TF COUNTING LIKELIHOOD — TF CANDIDATE 1 | 0x0831 | 0x0831 | 0x0A96 | 0x0A96 | |
| | TF JUDGMENT AND ADJUSTMENT TF | | | | 1 | |

FIG. 9

| TRANSPORT CH NO. | ELAPSE TIME (ms) | 0 | 10 | 20 | 30 | TTI |
|---|---|---|---|---|---|---|
| 2 | SEND TFCI | 35 | 23 | 23 | 29 | 40ms |
|  | RECEIVE TFCI | 35 | 1 | 22 | 11 |  |
|  | TF JUDGMENT | 1 | 0 | 1 | 0 |  |
|  | RECEIVING QUALITY (RECEIVING LEVEL: SIR) | −95dBm | −90dBm | −85dBm | −100dBm |  |
|  | TOTAL OF TF COUNTING RECEIVING QUALITY — TF CANDIDATE 0 | No data | −90dBm | −90dBm | −95dBm |  |
|  | TOTAL OF TF COUNTING RECEIVING QUALITY — TF CANDIDATE 1 | −95dBm | −95dBm | −90dBm | −90dBm |  |
|  | TF JUDGMENT AND ADJUSTMENT |  |  |  | 1 |  |

| TTI | ELAPSE TIME(ms) | 10 | 20 | 30 | 40 | |
|---|---|---|---|---|---|---|
| | SEND TFCI | 2 | 2 | 2 | 2 | |
| | | | | | | |
| 10ms | DETECTED TFCI | 2 | | | | |
| | ADJUSTMENT TFCI | 2 | | | | |
| 20ms | DETECTED TFCI | 2 | 2 | | | |
| | ADJUSTMENT TFCI | 2 | 2 | | | |
| 30ms | DETECTED TFCI | 2 | 2 | 1 | | |
| | ADJUSTMENT TFCI | 2 | 2 | 2 | | |
| 40ms | DETECTED TFCI | 2 | 2 | 1 | 2 | |
| | ADJUSTMENT TFCI | 2 | 2 | 2 | 2 | |

(MAJORITY RULE ADJUSTMENT)

US 7,327,710 B2

TRANSPORT FORMAT ADJUSTING UNIT OF CDMA RECEIVER

BACKGROUNDS OF THE INVENTION

1. Field of the Invention

The present invention relates to a receiver for use in a mobile communication system of CDMA (Code Division Multiple Access) method, and more specifically to a CDMA receiver capable of selecting a transport format (Transport Format: hereinafter, referred to as TF) of high reliability when determining transport format information for use in the decoding processing of a transport channel.

2. Description of the Related Art

Heretofore, this kind of CDMA receiver has offered a communication service for transmitting and receiving data of different types in various combinations, in order to cope with the recent progress of multi-media communication. The data combination information of several differently-defined TFs in this communication service is basically shown by Transport Format Combination Indicator (hereinafter, referred to as TFCI). This TFCI is the value indicating the combination of the TF (Transport Format) information in each transport channel, which is embedded into a wireless frame separately from data or information signal.

Since a transmitting party transmits the combination as TFCI, a receiving party has to receive it correctly. When the receiving party receives the TFCI improperly, the TF concerned with the whole frame of the received data will be improperly recognized and the data of the whole frame cannot be received correctly.

In order to solve this problem, there is disclosed a device for improving the accuracy in receiving and decoding data in an interleave period by more correctly detecting the TFCI for use in the receiving processing of each frame when receiving the data of interleave length over one frame (for example, refer to Japanese Patent Publication (Kokai) No. 2003-037583 (FIG. 1 and FIG. 2)).

Figure 10:
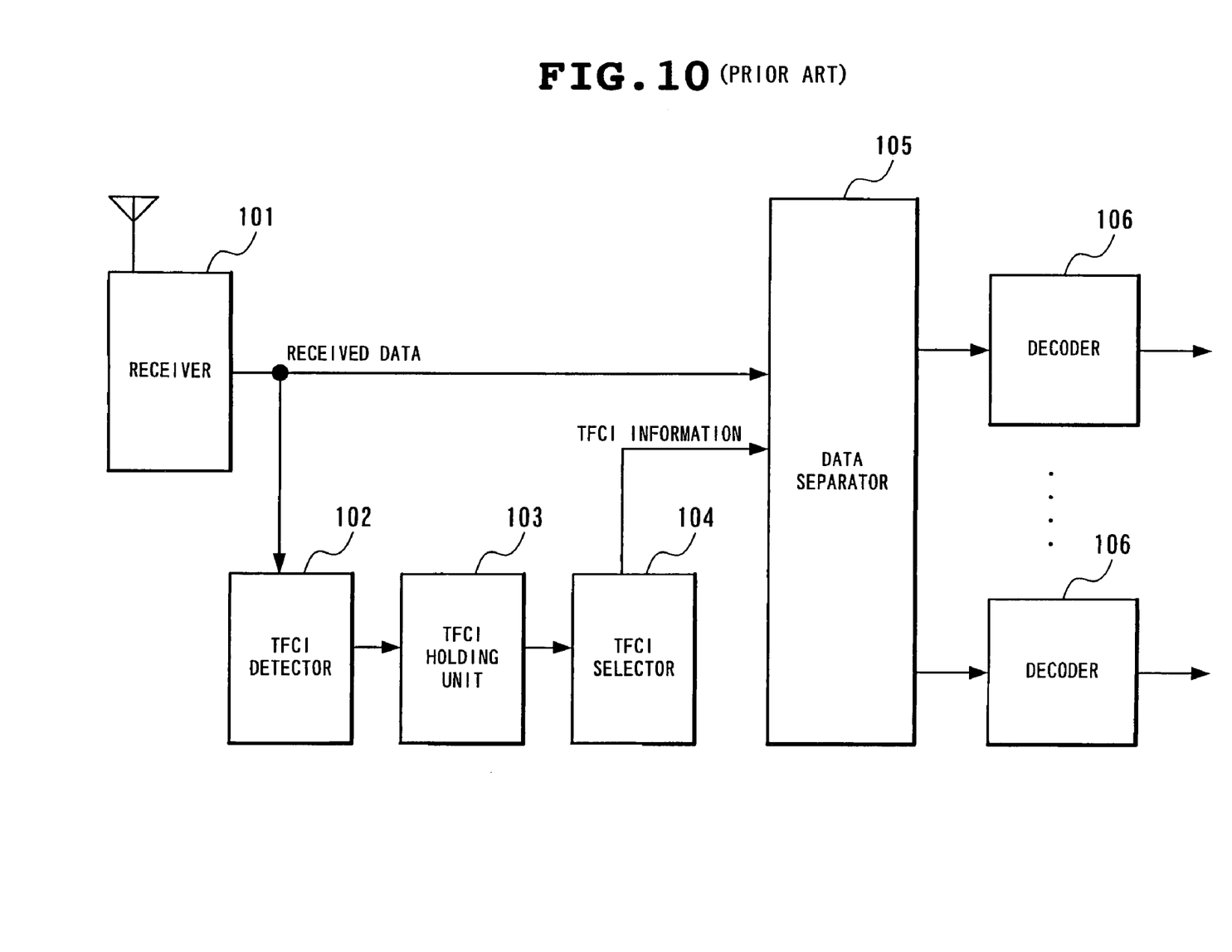
FIG. 10 is a view showing one example of the conventional function block.

For example, as illustrated in FIG. 10, a data signal received by an antenna and decoded by a receiver 101 enters a data separator 105. The mark of the TFCI included in this signal is detected through demapping by a TFCI detector 102 and kept in a TFCI holding unit 103.

A TFCI selector 104 decides the TFCI of the current frame, for example, by the rule of majority, when the kept TFCIs include different types. The decided TFCI is transmitted to the data separator 105 and the data separator 105 separates the received data of the above frame simultaneously transmitted from the receiver 101 according to this TFCI.

Figure 11:
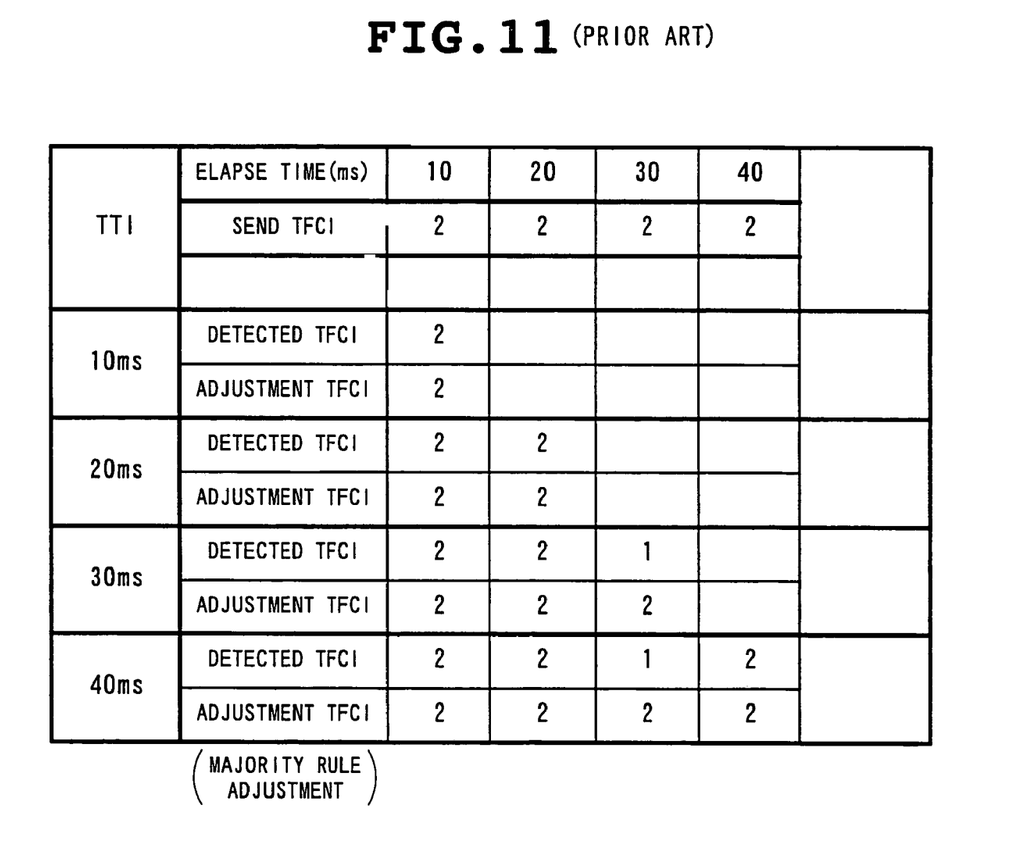
FIG. 11 is a view showing one example of selecting a TF according to the conventional majority decision rule.

With reference to FIG. 11, the case of receiving four frames of every 10 ms during the elapse time of 40 ms will be described. When the send TFCIs corresponding to the four frames are "2, 2, 2, 2", the receive TFCIs should be "2, 2, 2, 2".

As shown in a state of the wireless communication of propagating through the air, however, the TFCI "1" is detected in the period of 30 ms corresponding to the third frame.

Since the TFCIs "2" are detected in the first frame of 10 ms period and the second frame of 20 ms period, it makes an adjustment to modify the third TFCI to "2" by the rule of majority. Although the rule of majority is adopted as an adjustment method in this example, the above patent publication says that the receiving quality based on the receiving level may be adopted.

This kind of CDMA receiver generally requires the TF information including the block size and the number of blocks, that is the data unit used for the decoding processing, including transport channel separation, first interleaving, rate matching, error correction decoding by Viterbi decoder or turbo decoder, and CRC judgment (for example, refer to P. 103-119 and 143-146 of "W-CDMA Mobile Communication System" under the editorship of Keiji Tachikawa, published by Maruzen Co., Ltd. on Jun. 25, 2001).

This TF information is to be decided for every channel called a Transport Channel (hereinafter, abbreviated as transport CH) and it may take various values according to a cycle called as a Transmission Time Interval (hereinafter, abbreviated as TTI). This TTI takes the integral multiple value of the wireless frame length that is the minimum data unit of a wireless interface. As mentioned above, in a wireless period, since a plurality of transport CHs are multiplexed and then transmitted, the above TFCI indicating the combination of the TF information of each transport CH is embedded into a wireless frame and transmitted separately from the information signal.

Accordingly, before starting the decoding processing in the decoder of the CDMA receiver, it is necessary to judge the received TFCI signal and know the TF information necessary for the decoding processing of each transport CH. The TFCI can be changed in every minimum TTI in each transport CH and the TF information of the transport channel in which the TTI is not equal to the minimum transport time interval has to be constant within the interleaving, namely within the TTI.

The TFCI signal, mapped into one code of 30 bit length, is converted into the Reed-Muller code and transmitted.

The above-mentioned conventional CDMA receiver is provided with adjusting means for correcting an error of TFCI according to the rule of majority or the receiving quality, in order to correct the error of the combined transport formats. However, it is the transport format varying according to every transport channel that determines the size of the transport channel and the TFCI itself is changed in the minimum TTI of the multiplied transport channel. Therefore, the effective result on the error correction cannot be expected disadvantageously.

Namely, since it is impossible to judge whether the TFCI decoding algorithm has an error in the decoded TFCI, the system performs the decoding processing as if the obtained TFCI indicated the correct state of each transport channel of the wireless frame when the TFCI is decoded improperly.

Therefore, the multiplexing parameter, the rate matching, and the error correction decoding processing are improperly performed, which results in losing the wireless frame data of each transport channel. This failure is not detected until the following CRC (Cyclic Redundancy Check).

Since the upper layer function requires the system to transmit the lost wireless frame again, as a result of the loss of the information, a network will transmit the data again. Since the wireless resources are limited, however, the efficiency of using the wireless resources is deteriorated owing to the retransmission.

SUMMARY OF THE INVENTION

In order to solve the above problem, an object of the invention is to provide a CDMA receiver capable of selecting a transport format (TF) of high reliability even if receiving an improper TFCI when determining the transport format information to be used for the decoding processing of a transport channel.

According to the first aspect of the invention, a CDMA receiver used for a mobile communication system of CDMA (Code. Division Multiple Access) method, which comprises an adjusting unit for deciding a most reliable transport format as an adjustment transport format, of the received transport formats, when receiving various transport formats depending on frames during a transmission time interval of a transport channel.

Namely, since adjustment is not made on a wrong TFCI but on the combined and identified transport format, accuracy can be much more improved than in the adjustment based on the TFCI only.

In the preferred construction, the adjusting unit decides transport format information by selecting the following transport format as the adjustment transport format, when deciding the transport format information for use in decoding processing of a transport channel.

For example, the CDMA receiver may select the majority transport format of those having been received during the same transmission time interval. Alternatively, it may select the transport format having the largest sum of the TFCI (Transport Format Combination Indicator) likelihood in the frames having been obtained during the same transmission time interval. Further, it may select the transport format having the largest sum of the receiving quality information in the frames having been obtained during the same transmission time interval. It may select the transport format having the maximum value of the TFCI (Transport Format Combination Indicator) likelihood in the frames having been obtained during the same transmission time interval. It may select the transport format having the maximum value of the receiving quality information in the frames having been obtained during the same transmission time interval.

In another preferred construction, the adjusting unit decides transport format information by selecting the majority transport format as the adjustment transport format, of the transport formats received during the same transmission time interval, when deciding the transport format information for use in decoding processing of a transport channel, and of the processing to be performed in the final frame, transport channel separation, wireless frame combination, and first interleaving processing are performed according to the transport format information in each frame, while rate matching, error correction decoding, and CRC (Cyclic Redundancy Check) judging processing are performed according to the adjustment transport format selected in the transmission time interval.

According to these, the respective processing including the transport channel separation, the wireless frame combination and the first interleaving can be performed by the proper transport format information in each frame, thereby shortening the processing time.

According to another aspect of the invention, a transport format selecting method in a CDMA receiver used for a mobile communication system of CDMA (Code Division Multiple Access) method, comprising an adjusting step of deciding a most reliable transport format as an adjustment transport format, of the received transport formats, when receiving various transport formats depending on frames during a transmission time interval of a transport channel.

In the preferred construction, the adjusting step in which transport format information is decided by selecting the majority transport format as the adjustment transport format, of the transport formats received during the same transmission time interval, when deciding the transport format information for use in decoding processing of a transport channel.

In another preferred construction, the adjusting step in which transport format information is decided by selecting the transport format having the largest sum of TFCI (Transport Format Combination Indicator) likelihood in the frames obtained during the same transmission time interval as the adjustment transport format, when deciding the transport format information for use in decoding processing of a transport channel.

In another preferred construction, the adjusting step in which transport format information is decided by selecting the transport format having the largest sum of receiving quality information in the frames obtained during the same transmission time interval as the adjustment transport format, when deciding the transport format information for use in decoding processing of a transport channel.

In another preferred construction, the adjusting step in which transport format information is decided by selecting the transport format having the maximum of TFCI (Transport Format Combination Indicator) likelihood in the frames obtained during the same transmission time interval as the adjustment transport format, when deciding the transport format information for use in decoding processing of a transport channel.

In another preferred construction, the adjusting step in which transport format information is decided by selecting the transport format having the maximum of receiving quality information in the frames obtained during the same transmission time interval as the adjustment transport format, when deciding the transport format information for use in decoding processing of a transport channel.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

This time, preferred embodiments of the invention will be described with reference to the drawings. Since the size of the paper of each drawing is restricted, it shows only the main portion concerned with the invention.

This invention is different from the above-mentioned CDMA receiver in that the TF (Transport Format) information is obtained from the decoded TFCI (Transport Format Combination Indicator) information and that one adjustment TF is selected from several TFs obtained during the TTI (Transport Time Interval) and used for transport CH (channel) decoding.

Figure 1:
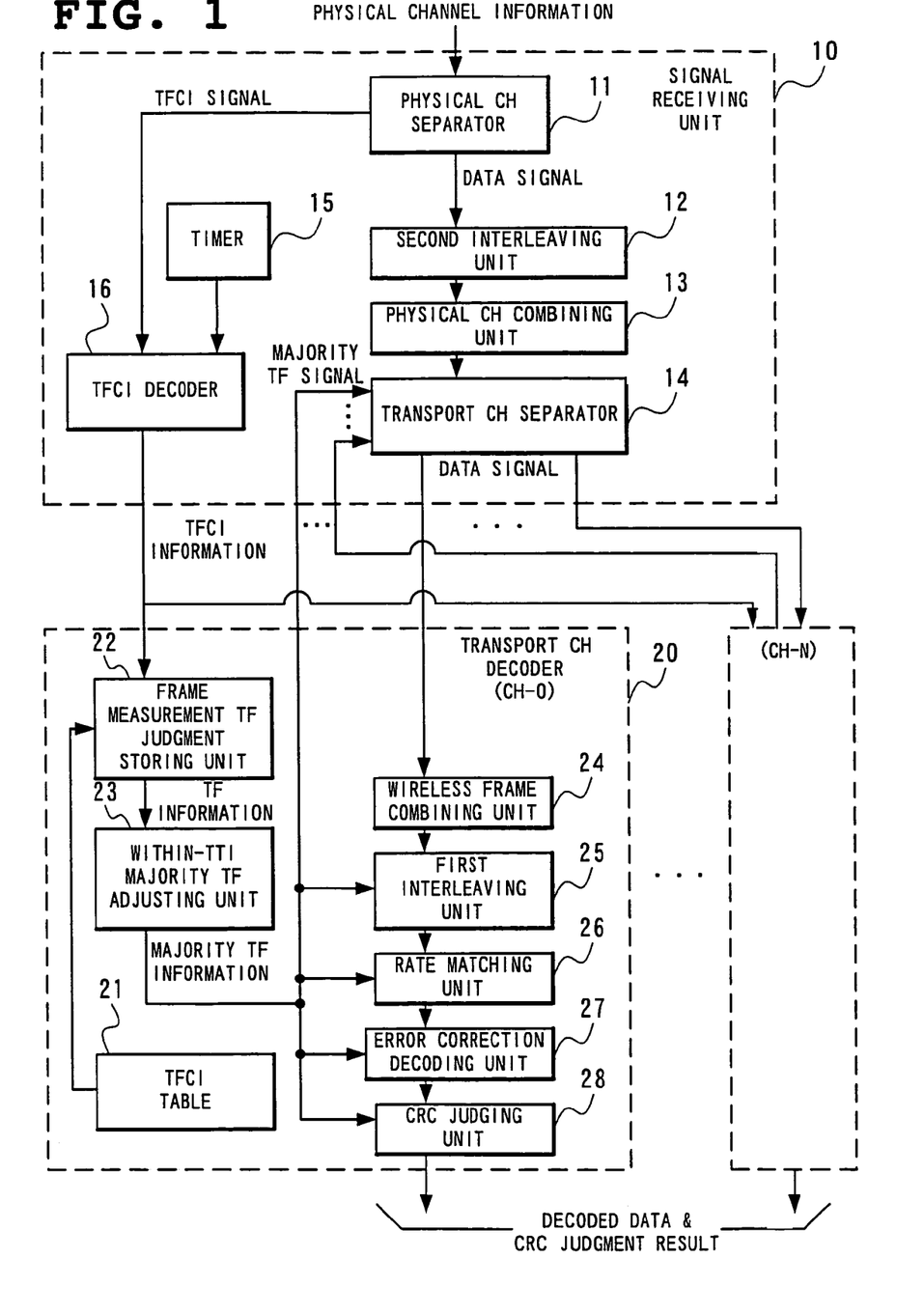
FIG. 1 is a function block diagram according to a first embodiment of the invention.

FIG. 1 is a function block diagram showing the first embodiment of the invention.

In a CDMA receiver shown in FIG. 1, a signal receiving unit 10 for receiving the physical channel information includes a physical CH separator 11, a second interleaving unit 12, a physical CH combining unit 13, a transport CH separator 14, a timer 15, and a TFCI decoder 16.

Further, a transport CH decoder 20 provided in every transport CH includes a TFCI table 21, a frame measurement TF judgment storing unit 22, a within-TTI majority TF adjusting unit 23, a wireless frame combining unit 24, a first interleaving unit 25, a rate matching unit 26, an error correction decoding unit 27, and a CRC judging unit 28.

The structure of FIG. 1 is characterized by the frame measurement TF judgment storing unit 22 and the within-TTI majority TF adjusting unit 23.

Upon receipt of the physical channel information, the physical CH separator 11 transmits a data signal separated into physical channels to the second interleaving unit 12, while it detects the TFCI signal and transmits it to the TFCI decoder 16. Though the physical CH separator 11 takes out a TPC (Transfer Power Control) signal and a pilot signal from the physical channel information, these signals are not concerned with the invention directly, the processing thereof is well known to those having skilled in the art, and therefore the description thereof is omitted here.

The second interleaving unit 12 performs the interleaving for, upon receipt of the data signal for every physical channel from the physical CH separator 11, rearranging the same in every physical channel and transmits the above to the physical CH combining unit 13. The physical CH combining unit 13 combines the information of several physical channels received from the second interleaving unit 12 together and transmits the same to the transport CH separator 14.

The transport CH separator 14 separates the data signal received from the physical CH combining unit 13 into each corresponding transport channel according to the majority TF received as the adjustment TF from the within-TTI majority TF adjusting unit 23 in the transport CH decoder 20 and transmits the data to the respective transport CH decoders 20.

The timer 15 notifies the TFCI decoder 16 of the frame timing. The TFCI decoder 16 decodes the TFCI signal received from the physical CH separator 11, from one code for 30 bits to the TFCI information of 10 bits, according to the Reed-Muller decoding and transmits the above to the frame measurement TF judgment storing unit 22 of the transport CH decoder 20. The TFCI information consists of the TFCI candidate and its correlation value (not illustrated). Since the Reed-Muller decoding is well known to those having skilled in the art, the description thereof is omitted here.

Figure 2:
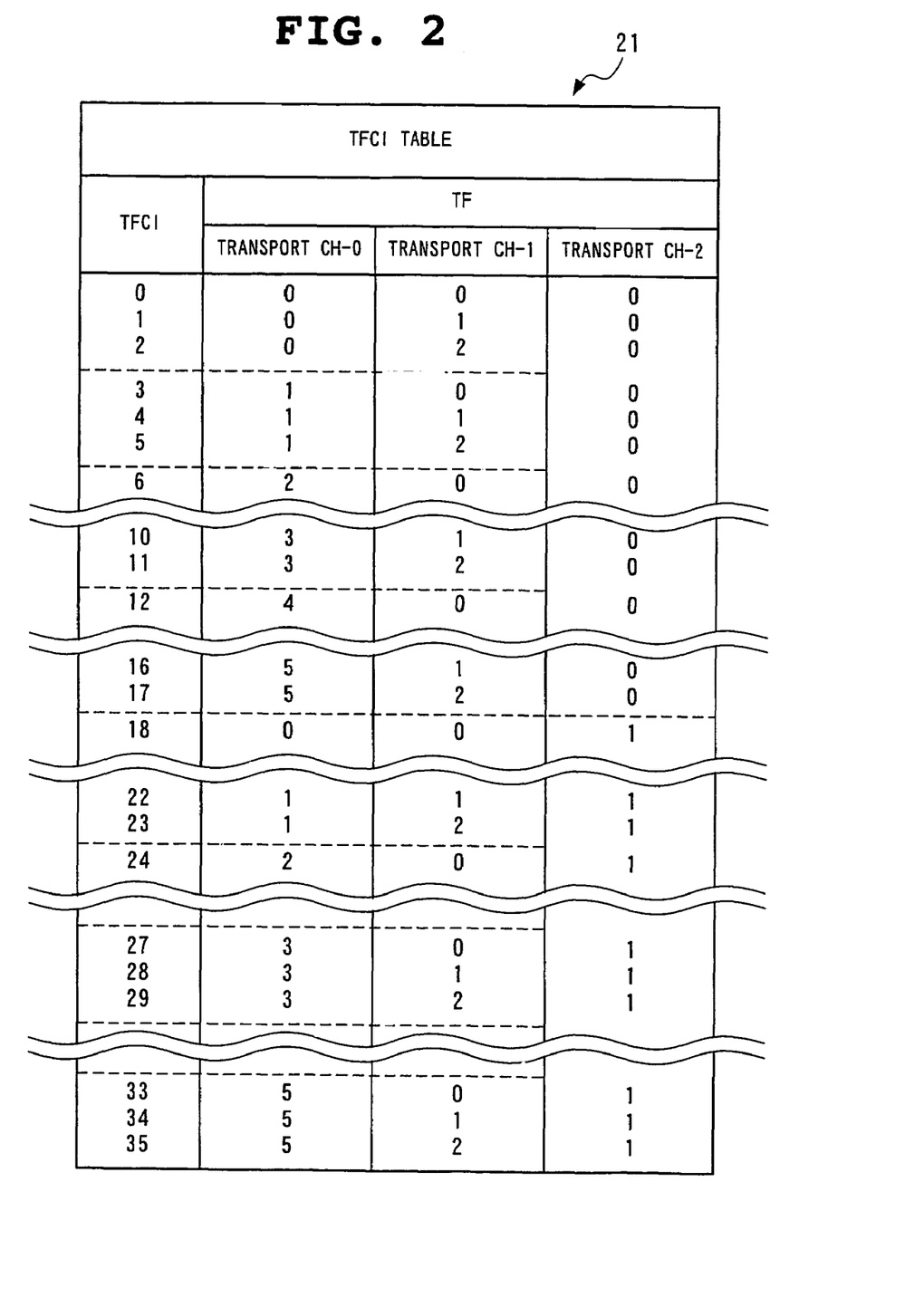
FIG. 2 is a view showing one example of TFCI table.

FIG. 2 shows the TFCI table 21 by way of example of the combination of TFs (Transport Format) in the respective three transport CHs-0, 1, 2.

In the TFCI table 21, every three TFs in the transport CH-0 has the same value sequentially selected from "0" to "5" in the TFCIs of "0 to 17" as well as in the TFCIs of "18 to 35", of the 36 TFCIs (0 to 35). In the transport CH-1, every three TFs has a combination of the values "0, 1, 2" in the respective 12 sets of the TFCIs; "0 to 2, 3 to 5, . . . , 33 to 35". In the transport CH-2, TF is "0" or "1" and the TFs in the TFCIs "0 to 17", take the value "0" and the TFs in the TFCIs "18 to 35" take the value "1".

The frame measurement TF judgment storing unit 22 of the transport CH decoder 20 provided for every transport CH checks and stores the TF information corresponding to each transport channel with respect to the TFCI information received from the TFCI decoder, with reference to the TFCI table 21 and transmits the above to the within-TTI majority TF adjusting unit 23, in reply to a call.

The within-TTI majority TF adjusting unit 23 takes in the TF information of a transport channel for every frame, counts the TF information of the transport CH, and transmits the majority TF information which is counted the most frequently in the final frame during the TTI in each transport CH, to the transport CH separator 14, the first interleaving unit 25, the rate matching unit 26, the error correction decoding unit 27, and the CRC judging unit 28.

According to the major TF information received, the transport CH separator 14, the first interleaving unit 25, the rate matching unit 26, the error correction decoding unit 27, and the CRC judging unit 28 segments the data into the size including the block number and the block size of each transport CH, thereby performing the decoding processing.

More specifically, the transport CH separator 14 separates the data received from the physical CH combining unit 13 into the data for every transport channel and transmits the above to the wireless frame combining unit 24 of each corresponding transport CH decoder 20. The wireless frame combining unit 24 combines the data for every transport channel received from the transport CH separator 14 by the TTI unit and transmits the same to the first interleaving unit 25. The first interleaving unit 25 performs the first interleaving on the received data, based on the transport channel size and transmits the result to the rate matching unit 26. The rate matching unit 26 repeats or punctures the received data according to the size of the transport channel and transmits the same to the error correction decoding unit 27. The error correction decoding unit 27 decodes the rate matched data received and transmits the decoded data to the CRC judging unit 28. The CRC judging unit 28 reports the decoded data as well as the CRC judgment result to the upper layer in every TTI.

This time, with reference to FIG. 3, the TF information to be handled in the TFCI decoder 16, the frame measurement TF judgment storing unit 22, and the within-TTI majority TF adjusting unit 23 of FIG. 1 will be described.

In the respective frames of the elapse times; 0 ms, 10 ms, 20 ms, and 30 ms shown in this figure, a change of the send TFCI like "35, 23, 23, 29" corresponds to a change of the receive TFCI like "35, 22, 23, 11". Namely, at the point of the frames of 10 ms and 30 ms, the number of the TFCI is different between the receiving time and the sending time. The TFs corresponding to the TFCI number are shown in FIG. 2 and for example, as for the TFCI "23", the respective TFs "1, 2, 1" are obtained in the respective transport CHs-0, 1, 2.

In this example, when a terminal receives the TFCI transmitted by a base station, even when failing in the TFCI decoding because of deterioration of the communication environment, the output TFs "5, 1, 1, 3" of the frame measurement TF judgment storing unit 22 are adopted here as they are, since the TTI is 10 ms in the transport CH-0. Since the TTI is 20 ms in the transport CH-1, the TF judgment results in "2, 1" in the first TTI corresponding to the frames of elapse times, 0 ms and 10 ms, which causes the disagreement of information. At this time, the within-TTI majority TF adjusting unit 23 selects the TF "2" having the large size of the transport CH and defines it as the adjustment TF. In the transport CH-2, since the TTI is 40 ms, the TF "1" corresponding to three of the four TF information is defined and selected as the adjustment TF.

Figure 3:
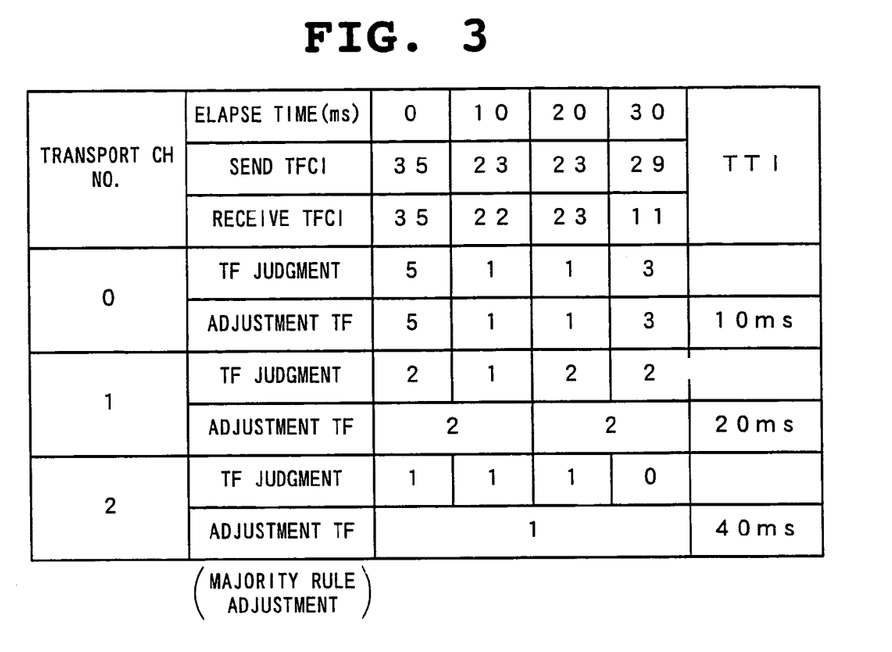
FIG. 3 is a view showing the selection of the adjustment TF by the majority decision rule according to the first embodiment of the invention.
Figure 4:
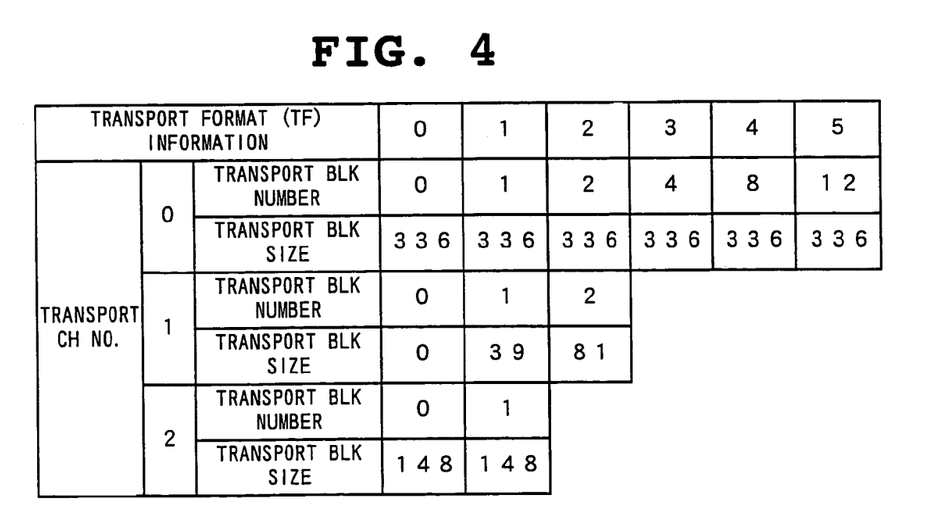
FIG. 4 is a view showing the size of the transport format information according to the first embodiment of the invention.

FIG. 4 shows one example of the relationship between the number of the transport block (Blk) and the size of the transport block (Blk) in the TF information of each transport channel corresponding to the above FIG. 2 and FIG. 3.

Figure 5:
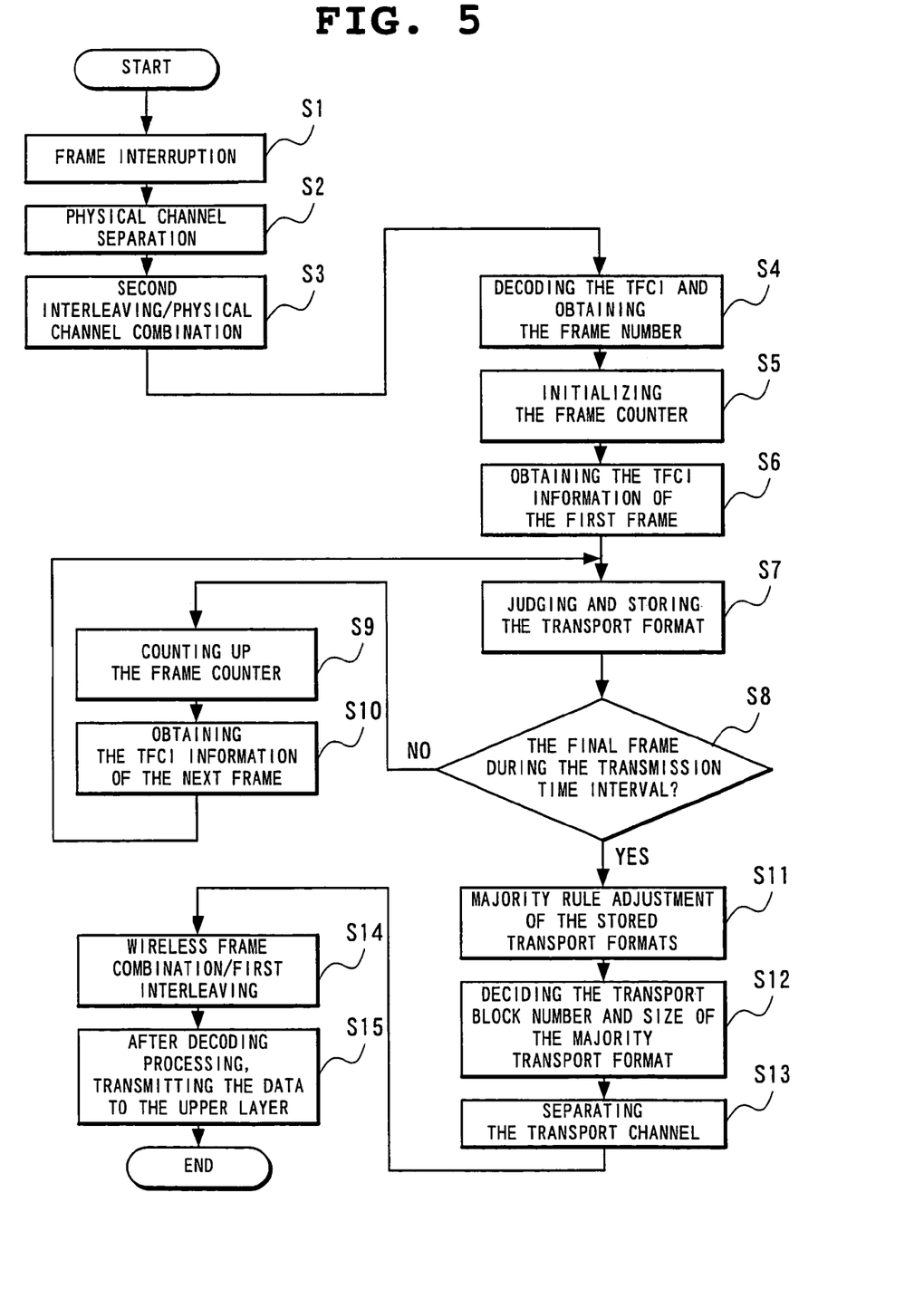
FIG. 5 is a flow chart showing the procedure according to the first embodiment of the invention.

The procedure of the main operation in FIG. 1 will be described with reference to FIG. 5, in combination with FIGS. 1 to 4.

At first, the physical channel information obtained by frame interruption in the physical CH separator 11 (Step S1) is separated into a data signal, a TFCI signal, a TPC (Transport Power Control) signal, and a pilot signal (Step 2). The data signal is transmitted from the physical CH separator 11 to the second interleaving unit 12, where it is subjected to the secondary interleaving, and then it is combined together in every physical channel (Step S3). While, the TFCI signal separated by the above Step S2 is decoded into the TFCI information by the TFCI decoder 16, and the TFCI decoder 16 obtains the frame number (Step S4) from the timer 15. The TPC signal and the pilot signal are used as another function than the function of this invention as mentioned above.

In the transport CH decoder 20, the frame measurement TF judgment storing unit 22 initializes the frame measurement (Step S5) and starts the measurement of the frame timing, and at the same time, obtains the TFCI information of the first frame transmitted from the TFCI decoder 16 (Step S6) in each transport CH. The frame measurement TF judgment storing unit 22 judges the TF of the transport channel based on the TFCI table 21 according to the obtained TFCI information and stores the TF in every frame (Step S7). Accordingly, the TF judgment shown in FIG. 3 is stored in a sequence of the frames in each transport CH.

The within-TTI majority TF adjusting unit 23 judges whether the frame number is the final frame during the TTI in the transport channel (Step S8). When it is "NO" and not the final frame in Step S8, the frame counter is counted up by one (Step S9), and obtains the TFCI information of the next frame (Step S10) and the operation is returned to Step S7, where the above steps are repeated.

On the other hand, when it is "YES" and the final frame in Step S8, the following processing is performed.

At first, the majority rule adjustment is performed (Step S11), in which the majority TF during the TTI is determined as the adjustment TF, of the TFs stored in the Step S7, and the adjustment TF by use of the majority TF is transmitted to the transfer CH separator 14, the first interleaving unit 25, the rate matching unit 26, the error correction decoding unit 27, and the CRC judging unit 28. When receiving the adjustment TF that is the majority TF, the number of blocks and the block size, that are the channel size of the transport CH is decided according to the adjustment TF (Step S12).

The transport CH separator 14 performs the transport channel separation according to the transport channel size (Step S13), and after performing the wireless frame combination and the first interleaving in each transport channel (Step S14), the decoding processing including the rate matching, the error correction decoding, and the CRC judgment is performed and the decoded data and the CRC judgment result are transmitted to the upper layer (Step S15), hence to finish the processing.

The processing of the transport CH decoder 20 is repeated for the number of the transport channels.

The operation of storing each TF for every frame by repetition of Step S5 to Step S8 and further Step S9 and Step S10 can be performed by the well-known counting means. For example, a counter area for the number of the TFs is predetermined in every transport CH. Namely, in the case of the transport CH-2 in FIG. 3, the counter area is "3". As illustrated in Step S5, the area is initialized at "0" in the head frame of TTI in every transport channel. In Step S6, the TFCI of each frame is established, the TF of the transport channel is judged according to the TFCI table in Step S7, and the value is compared with "0" in Step S8. When there is no coincidence by comparison, that is, in the case of "NO", "1" is added to the counter and the operation is returned from Step S10 to Step S7. When the counter is counted up to "3" through repetition of the backward procedure, Step S8 results in "YES" and coincidence, and the final frame can be detected.

Further, a well-known method can be used for the adjusting operation of TF for use in decoding during the TTI, of the TFs stored in every frame. For example, the operation procedure is repeated for the number of the TFs of the transport channel and the maximum of the TF storing area where the TFs are stored in every frame in Step S7 is selected. For example, the TFs may be aligned in the order of increasing in number, for every transport channel in Step S7, so as to make it possible to instantly select the TF having the larger transport channel size in Step S11.

In the above description, although Step S4 follows Step S3, the parallel operations of Step S3 and Step S4 are preferable for shortening the processing time. Even if the order is replaced, it is possible to satisfy a predetermined function according to the operation within a predetermined time.

As mentioned above, although this embodiment has been described with reference to the function block and flow chart shown in the figures, distribution of the functions after their separation and combination or modification such as the replacement of the procedure is not restricted to the above but free as far as the above functions are satisfied, and the above description is not to restrict the invention.

A second embodiment different from the above description will be described with reference to FIG. 6 and FIG. 7.

The second embodiment is devised to shorten the processing time in the final frame of the TTI.

Specifically, though the decoded result of the transport channel has to be delivered to the upper layer within a predetermined elapse of time from the final frame transfer of the transmission time interval, it is actually preferable that the wireless information is diversely diffused and that the processing time has to be as short as possible since the processing time is generated in the second interleaving, the physical channel combination, the transfer channel combination, the wireless frame combination, the first interleaving, the rate matching, the error correction decoding, and the CRC judgment. Therefore, in order to shorten the processing time in the TTI final frame, the processing which can be performed in the other frame than the TTI final frame, for example, the second interleaving or the physical channel combination is performed prior to the adjustment of the majority TF. In order to do the above, it is necessary to define the size of the transport channel and usually TF is fixed in every transport channel in the head frame of the TTI and the physical channel combination, the second interleaving, and the first interleaving are performed.

Accordingly, in the second embodiment, in order to shorten the processing time in the final frame of the TTI, the processing which can be performed in the other frame than the TTI final frame is performed in the usual frame. It is designed in that the processing to be performed in the usual frame includes the transport channel separation, the wireless frame combination, and the first interleaving, and the TF information which can be required from the TFCI of each frame is used as TF for performing the above processing. The majority TF within the TTI is used as the TF information for use in the rate matching, the error correction decoding, and the CRC judgment.

Figure 6:
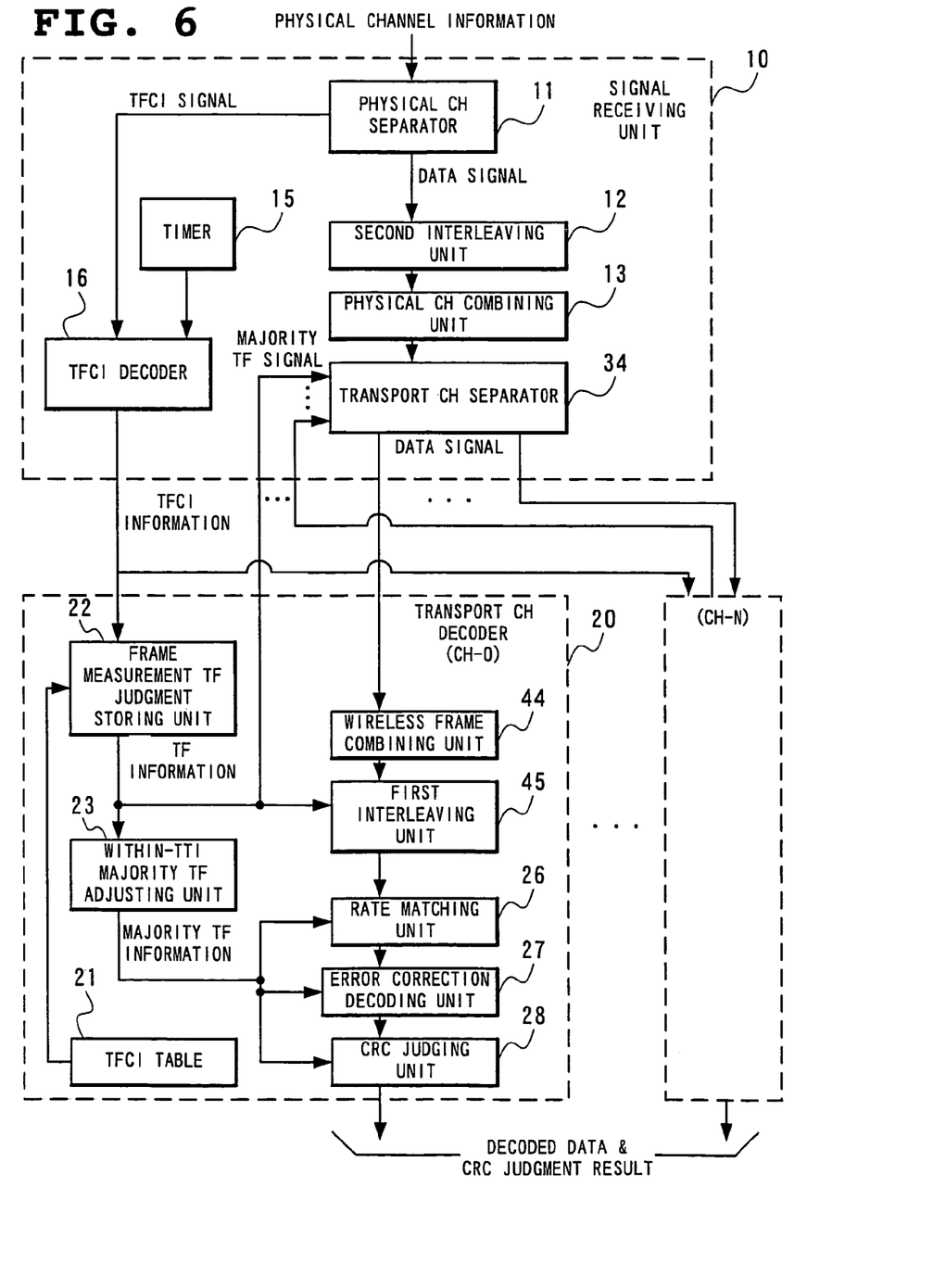
FIG. 6 is a function block diagram according to a second embodiment of the invention.

In short, FIG. 6 of the second embodiment is different from FIG. 1 in that the transport CH separator 34, the wireless frame combining unit 44, and the first interleaving unit 45 receive the TF information transmitted by the frame measurement TF judgment storing unit 22, not the majority TF information. The component other than this is the same as that of FIG. 1 and the description thereof is omitted.

Figure 7:
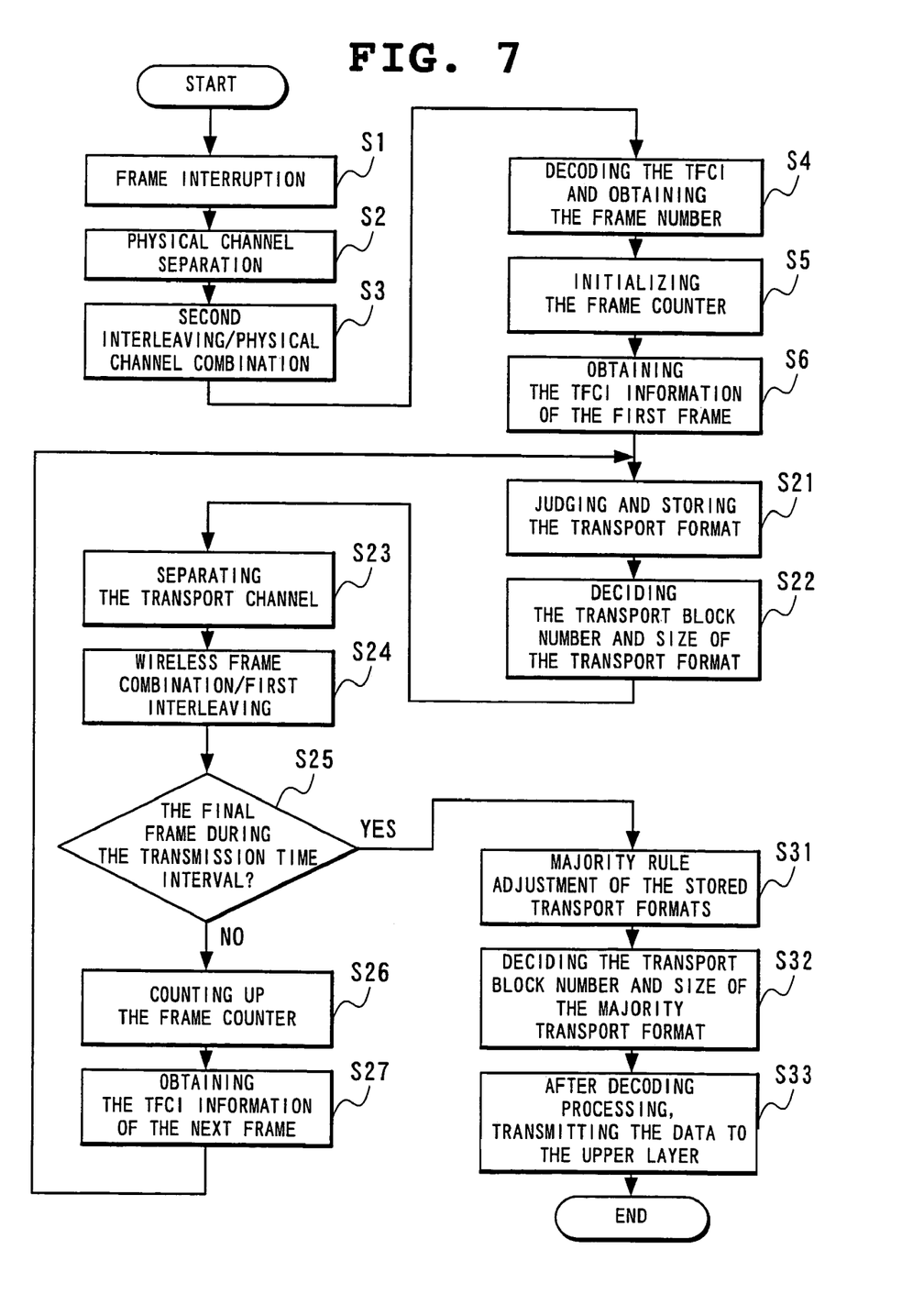
FIG. 7 is a flow chart showing the procedure according to the second embodiment of the invention.

FIG. 7 is a flow chart showing the procedure of the main operation in FIG. 6.

FIG. 7 is different from FIG. 5 in the procedure later than the judgment and storing of the transport format following Step S6.

Specifically, the frame measurement TF judgment storing unit 22, upon receipt of the TFCI information from the TFCI decoder 16 in Step S6, judges the TF of the transport channel according to the obtained TFCI information based on the TFCI table 21 and stores the TF for every frame (Step S21). Accordingly, in each transport channel, the TF judgment as shown in FIG. 3 is recorded and stored in the order of frames. This TF information includes the size of the transport channel of each frame and the number of the transport blocks and the block size of the TF are determined according to the recorded and stored TF information (Step S22). This TF information is sent to the transport CH separator 34 and the first interleaving unit 45.

The transport CH separator 14 separates the transport channel according to the transport channel size (Step S23), and the wireless frame combination and the first interleaving are performed in each transport channel (Step S24).

The within-TTI majority TF adjusting unit 23 judges whether the frame number is the final frame of TTI of the transport channel (Step S25), and when it is "NO" and not the final frame in Step S25, the frame counter is counted up by one (Step S26), the TFCI information of the next frame is obtained (Step S27), and this step is returned to Step S21, where the procedure will be repeated. On the other hand, when it is "YES" and it is the final frame in Step S25, the following processing will be performed.

At first, the majority rule adjustment of determining the majority TF within the TTI (Step S31), of the TFs stored in Step S21 is performed, and the adjustment TF that is the majority TF is transmitted to the rate matching unit 26, the error correction decoding unit 27, and the CRC judging unit 28. Upon receipt of the adjustment TF that is the major TF, after deciding the number of blocks and the block size indicating the channel size of the transport CH (Step S32), according to the adjustment TF, the decoding processing including the rate matching, the error correction decoding, and the CRC judgment is performed and the decoded data and the CRC judgment result are transmitted to the upper layer (Step S33), hence to finish the processing.

Thus, it is possible to decrease the throughput during one frame by dividing the processing to be performed in the usual frame and the processing to be performed in the final frame. By decreasing this throughput, a circuit operating at a high speed becomes unnecessary, hence to decrease the power consumption. Further, by performing the processing to be performed in the final frame of TTI in the other frame, the decoding throughput during the TTI can be averaged, the processing speed of the CDMA receiver which is required in the final frame of the TTI can be restrained, and therefore, the CDMA receiver does not require an excessive high speed processing ability.

Figure 8:
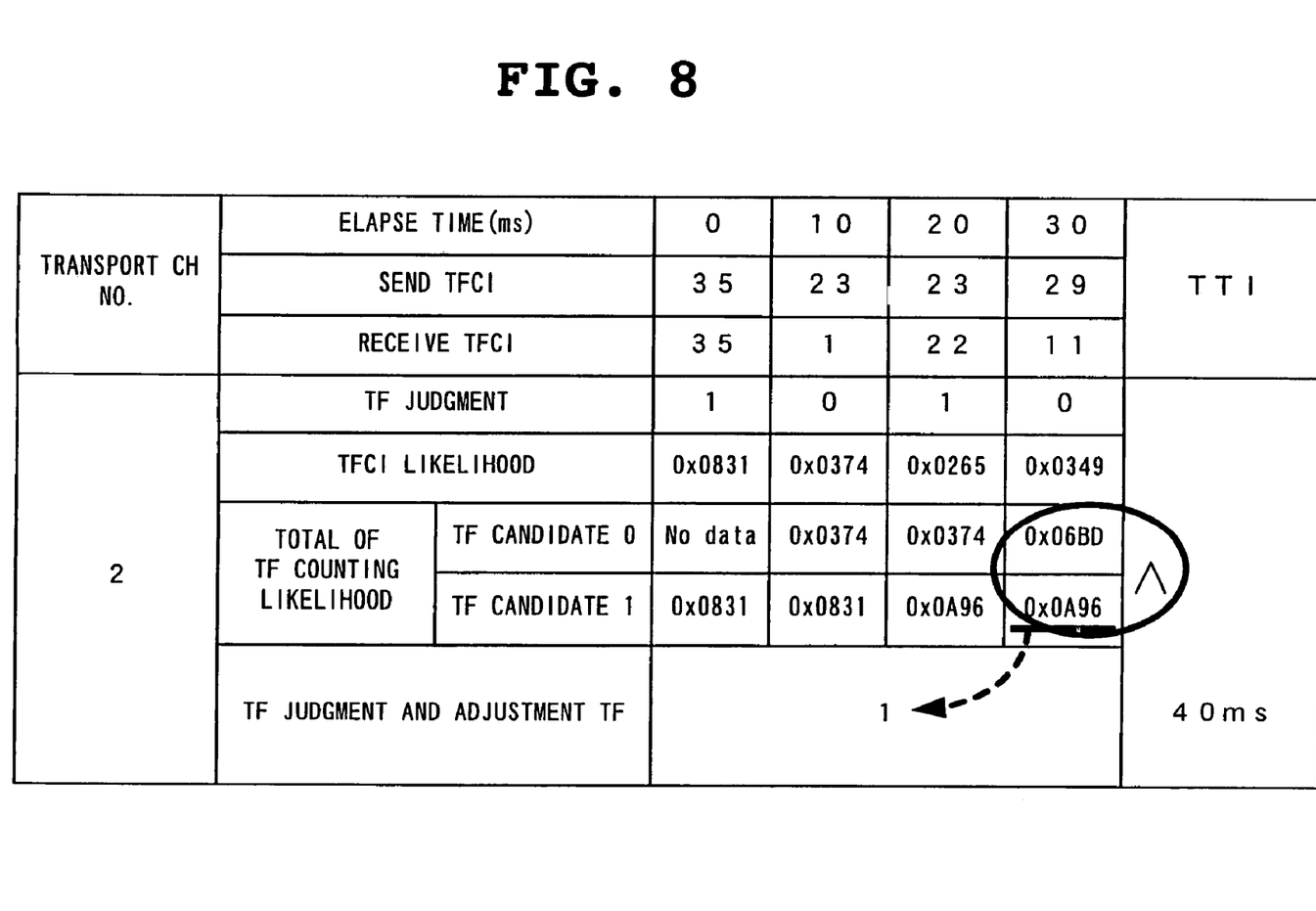
FIG. 8 is a view showing the selection of the adjustment TF by the likelihood total according to a third embodiment of the invention.

This time, in FIG. 8, a third embodiment of the invention will be described in combination with the first embodiment described with reference to FIG. 1 to FIG. 5.

In Step S7, the frame measurement TF judgment storing unit 22 also records the likelihood information of the TFCI of a frame having the TF required, for example, "0x0831, 0x0374, 0x0265, 0x0349" as shown in the figure, when storing the TF. The likelihood of the TFCI shows the correlation between the TFCI information and the TFCI and according as the likelihood is larger, it shows that the correlation between the TFCI and the TFCI data is higher. Namely, it may be considered that higher reliability is given to the TF having the larger likelihood of the TFCI.

Accordingly, the within-TTI majority TF adjusting unit 23 calculates the total of the likelihood for every TF according to the TF adjustment processing by using the maximum likelihood and the TF having the largest sum of the likelihood is defined as the adjustment TF. By using this adjustment TF, the transport channel separation, the first interleaving, the error correction decoding, and the CRC judgment are performed. In FIG. 8, since the likelihood total "0x0A96" of the TF candidate "1" is larger than the likelihood total "0x06BD" of the TF candidate "0", "1" is selected as the adjustment TF.

As mentioned above, according to the above-mentioned embodiment, since the TF of higher reliability can be selected, it is possible to report the transport channel information of less TF error to the upper layer.

In this third embodiment, although the total value of likelihood is used as a judging reference, the average value of the likelihood or the maximum value may be used and also in this case, the same effect can be obtained.

This time, in FIG. 9, a fourth embodiment of the invention will be described in combination with the above-mentioned first embodiment with reference to FIG. 1 and FIG. 5.

In the fourth embodiment, in the case of counting the TFs at a time of storing them in the frame measurement TF judgment storing unit 22, signal-versus-noise and signal-to-interference ratio (SIR) of each frame are recorded. The signal versus noise and the signal-to-interference ratio (SIR) show the receiving quality of each frame. Accordingly, it can be considered that higher reliability is given to the TF having the larger SIR.

Namely, in Step S7, the frame measurement TF judgment storing unit 22 sequentially records the receiving quality of the frame having got the TF, for example, "−95 dBm, −90 dBm, −85 dBm, −100 dBm" as shown in the figure, together with the other information when storing the TF.

Accordingly, the within-TTI majority TF adjusting unit 23 executes the TF adjusting processing by the maximum receiving quality, calculates the total of SIR for every TF, and selects the TF having the largest SIR total as the adjustment TF. Accordingly, by using this adjustment TF, the transport channel separation, the first interleaving, the error correction decoding, and the CRC judgment are performed.

Figure 9:
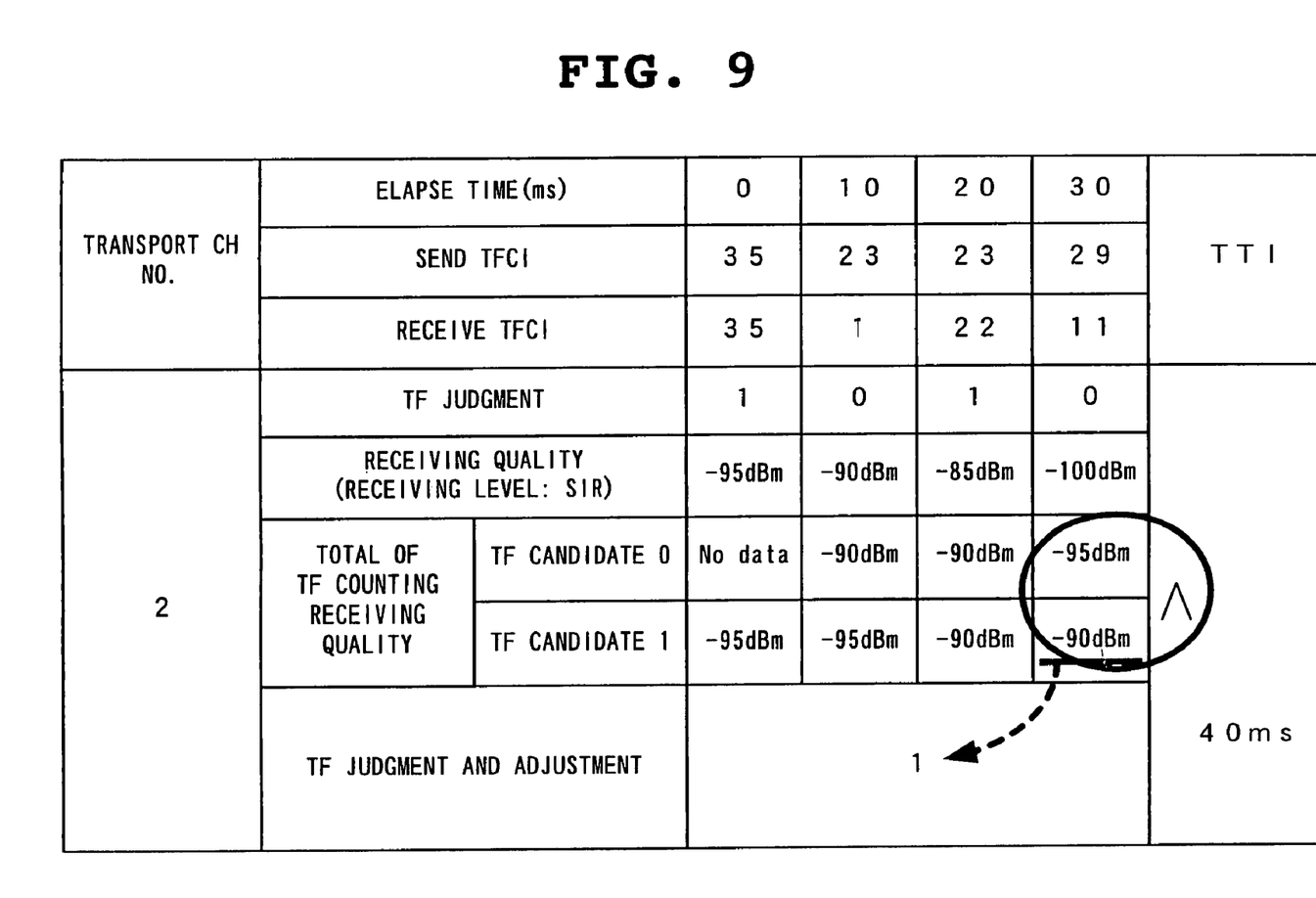
FIG. 9 is a view showing the selection of the adjustment TF by the total of the receiving quality according to a fourth embodiment of the invention.

In FIG. 9, since the total "−90 dBm" of the receiving quality of the TF candidate "1" is larger than the total "−95 dBm" of the receiving quality of the TF candidate "0", "1" is selected as the adjustment TF.

Thus, according to the above mentioned embodiments, since the TF having the higher reliability can be further selected, it is possible to report the transport channel information of much less TF error to the upper layer.

In this fourth embodiment, although the signal versus noise and the signal-to-interference ratio (SIR) are used as a signal for measuring the receiving quality, another signal indicating the receiving quality may be used and also in this case, the same effect can be obtained.

As set forth hereinabove, this invention is effective in providing a CDMA receiver capable of selecting a TF of much higher reliability.

The reason is that the most reliable one of the transport formats received is decided as the adjustment transport format when receiving various transport formats for every frame during the transmission time interval of a transport channel as the transport format for use in various processing, at least including rate matching, error correction decoding, and CRC judgment. For example, when determining the transport format information for use in the decoding processing of a transport channel, of the transport formats in frames obtained during the same transmission time interval, the majority transport format, the transport format having the largest likelihood, or the transport format having the highest receiving quality is to be selected and defined as the most reliable one.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A CDMA receiver used for a mobile communication system of CDMA (Code Division Multiple Access) method, comprising:
   an adjusting unit for deciding a most reliable transport format as an adjustment transport format, of the received transport formats, when receiving various transport formats depending on frames during a transmission time interval of a transport channel,
   wherein said adjusting unit decides transport format information, by selecting the transport format having the largest sum of receiving quality information in the frames obtained during the same transmission time interval as said adjustment transport format, when deciding the transport format information for use in decoding processing of a transport channel.

2. The CDMA receiver as set forth in claim 1, wherein said adjusting unit
   of the processing to be performed in the final frame, transport channel separation, wireless frame combination, and first interleaving processing are performed according to the transport format information in each frame, while rate matching, error correction decoding, and CRC (Cyclic Redundancy Check) judging processing are performed according to said adjustment transport format selected in the transmission time interval.

3. A CDMA receiver used for a mobile communication system of CDMA (Code Division Multiple Access) method, comprising:
   an adjusting unit for deciding a most reliable transport format as an adjustment transport format, of the received transport formats, when receiving various transport formats depending on frames during a transmission time interval of a transport channel,
   wherein said adjusting unit decides transport format information, by selecting the transport format having the maximum of receiving quality information in the frames obtained during the same transmission time interval as said adjustment transport format, when deciding the transport format information for use in decoding processing of a transport channel.

4. The CDMA receiver as set forth in claim 3, wherein of the processing to be performed in the final frame, transport channel separation, wireless frame combination, and first interleaving processing are performed according to the transport format information in each frame, while rate matching, error correction decoding, and CRC (Cyclic Redundancy Check) judging processing are performed according to said adjustment transport format selected in the transmission time interval.

5. A transport format selecting method in the CDMA receiver used for a mobile communication system of CDMA (Code Division Multiple Access) method, comprising:
   an adjusting step of deciding a most reliable transport format as an adjustment transport format, of the received transport formats, when receiving various transport formats depending on frames during a transmission time interval of a transport channel,
   wherein said adjusting step in which transport format information is decided by selecting the transport format having the largest sum of receiving quality information in the frames obtained during the same transmission time interval as said adjustment transport format, when deciding the transport format information for use in decoding processing of a transport channel.

6. A transfer format selecting method in the CDMA receiver used for mobile communication system of CDMA (Code Division Multiple Access) method, comprising:
   an adjusting step of deciding a most reliable transport format as an adjustment transport format, of the received transport formats, when receiving various transport formats depending on frames during a transmission time interval of a transport channel, wherein said adjusting step in which transport format information is decided by selecting the transport format having the maximum of receiving quality information in the frames obtained during the same transmission time interval as said adjustment transport format, when deciding the transport format information for use in decoding processing of a transport channel.

* * * * *